(12) United States Patent
Ulichney et al.

(10) Patent No.: US 11,113,592 B2
(45) Date of Patent: Sep. 7, 2021

(54) DATA-BEARING MEDIUM

(71) Applicant: Hewlett-Packard Development Company, L.P., Spring, TX (US)

(72) Inventors: Robert Ulichney, Stow, MA (US); Matthew D. Gaubatz, Seattle, WA (US); Stephen Pollard, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/471,252

(22) PCT Filed: Apr. 18, 2017

(86) PCT No.: PCT/US2017/028119
§ 371 (c)(1),
(2) Date: Jun. 19, 2019

(87) PCT Pub. No.: WO2018/194566
PCT Pub. Date: Oct. 25, 2018

(65) Prior Publication Data
US 2020/0117969 A1  Apr. 16, 2020

(51) Int. Cl.
*G06K 19/06* (2006.01)
(52) U.S. Cl.
CPC ............... *G06K 19/06093* (2013.01)
(58) Field of Classification Search
CPC ............... G06K 19/00; G06K 19/04
USPC .................................. 235/494, 487, 375
See application file for complete search history.

(56) References Cited

U.S. PATENT DOCUMENTS

| | | | |
|---|---|---|---|
| 6,115,140 A | 9/2000 | Bresler et al. | |
| 8,014,035 B2 | 9/2011 | Monga et al. | |
| 8,284,987 B2 | 10/2012 | Ulichney et al. | |
| 2003/0007187 A1 | 1/2003 | Curry | |
| 2003/0197878 A1 | 10/2003 | Metois et al. | |
| 2009/0180152 A1* | 7/2009 | Bala | H04N 1/4055 358/3.28 |
| 2012/0163714 A1 | 6/2012 | Cyetkovic et al. | |
| 2013/0044948 A1 | 2/2013 | Gaubatz et al. | |
| 2016/0110635 A1* | 4/2016 | Chen | G06K 19/06103 235/494 |

(Continued)

FOREIGN PATENT DOCUMENTS

| | | |
|---|---|---|
| CN | 101159028 | 4/2008 |
| CN | 102298953 | 12/2011 |
| CN | 103905745 | 7/2014 |

(Continued)

OTHER PUBLICATIONS

Bulan, O., High Capacity Data Embedding for Printed Documents, 2011, < https://urresearch.rochester.edu/fileDownloadForInstitutionalItem.action?itemId=21685&itemFileId=70188 >.

(Continued)

*Primary Examiner* — Edwyn Labaze
(74) *Attorney, Agent, or Firm* — Dicke Billig & Czaja PLLC

(57) ABSTRACT

A data-bearing medium is disclosed. The data-bearing medium includes a section of cells having a set of opposite-shifted clusters. The cells include a combination of opposite shifts of the set of opposite-shifted clusters, which represent a single value.

15 Claims, 8 Drawing Sheets

(56) References Cited

U.S. PATENT DOCUMENTS

2016/0344890 A1 11/2016 Ulichney et al.

FOREIGN PATENT DOCUMENTS

| CN | 105745597 | 7/2016 |
| EP | 3007108 A1 | 4/2016 |
| WO | WO-2015041684 | 3/2015 |

OTHER PUBLICATIONS

Chen, Yung-Yao et al., "Design of image barcodes for future mobile advertising." EURASIP Journal on image and video processing 2017, No. 1 (2017): 11.

* cited by examiner

DATA-BEARING MEDIUM

BACKGROUND

Data-bearing media can include data-bearing images, data-bearing magnetic media, data-bearing optical media, and other media. Examples of data-bearing images can include linear barcodes, matrix barcodes, and data-bearing halftone images such as visually significant barcodes. Data-bearing halftone images can convey digital information through printing and imaging via selectively manipulating and then interpreting the halftone structure associated with a given carrier image.

DETAILED DESCRIPTION

Figure 1:
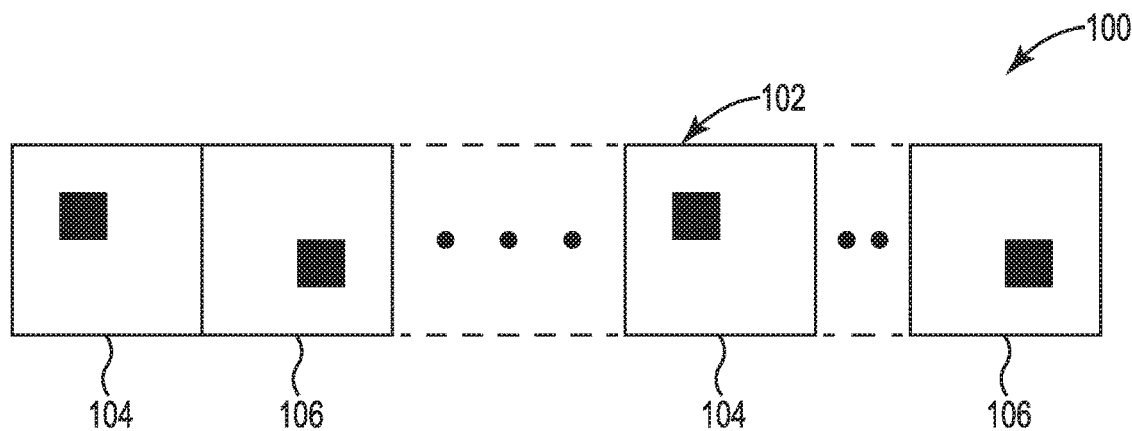
FIG. 1 is a schematic diagram illustrating an example of data-bearing medium.

Data-bearing halftone images, such as visually significant barcodes, provide an effective mechanism to embed high capacity data in halftone images that can be more aesthetically pleasing than barcodes. Data-bearing halftone images can convey information in existing images on labels or pages as an alternative to additional barcodes. This information can be encoded in the halftone of a carrier image by selectively shifting halftone clusters, or repositioning the cluster, to carry bits of a digital payload. The small size and large number of halftone cells in a printed carrier image can provide for information densities of over 2000 bits per square inch. Data readers can interpret the shifts of the halftone clusters in the image to reproduce the payload.

The process of halftoning transforms an image of greater amplitude resolution, such as a continuous tone image, into an image with lesser amplitude resolution, such as black or white dots or other multi-tonal combination. For example, halftoning is used to transform a grayscale photograph into a picture on the page of a newspaper. One example of halftoning includes clustered-dot halftones in which the dots vary in size at regular intervals in the image. Clustered-dot halftones can be distinguished from dispersed-dot halftones in which the size of the dot is held constant but the intervals between the dots of the image are varied. A clustered-dot halftone image or portion of an image can be formed from a contiguous array of cells each including a colored cluster of a selected size.

In a clustered-dot halftone image, colored clusters can be formed inside of or with respect to a two-dimensional threshold array. A threshold array can be comprised of a number of cells in which a dot cluster will form. An example of a cell used for illustration includes a square matrix of i by i pixels. For instance, a four-by-four cell includes sixteen pixels, and a cluster can include one or more of the pixels of a selected color in a multi-tonal combination. The clusters in clustered-dot patterns are nucleated in pixel groups of various sizes. For example, a square matrix of i by i pixels can include one of $i^2$ cluster sizes. A cluster size of one can be a cell having one pixel that is a first color of a multi-tonal combination, such as black in a black/white color combination, and the remaining pixels are colored a second color of the multi-tonal color combination, such as white. Generally, a cluster size of k can be a cell of $i^2$ pixels having k pixels in the first color and any remaining pixels ($i^2-k$) in the second color in which $i^2 \geq k$.

In all but a cluster size of $i^2$ pixels in a cell of i by i pixels, the cluster can be mapped onto a cell to include different groupings of pixels within the cell. For example, a cluster size of one can be mapped onto any one of the sixteen pixels within a four-by-four cell. A cluster of size one can adopt one of sixteen positions within the cell, and each one of these sixteen positions is shifted from the other fifteen possible positions. A shift repositions the cluster of a given size within the cell or with respect to the cell boundaries.

Selected shifts of a cluster have been used to carry data. A cluster that can shift between two positions within a cell can carry one binary digit, or bit, of data. In a rudimentary example, a given cluster in a first position or shifted in a first direction within a cell can carry a bit value of zero while a shifted version of the cluster of the same size in a second position or shifted in a second direction within the cell can carry a bit value of one. An array of cells in at least a portion of the data-bearing image can thus carry a string of bits. This string of bits can be referred to as a raw payload or, for the purposes of this application, as a payload. In some examples, a cluster can be mapped or repositioned to several different pixel shift positions and can carry more than one bit of information. Systems that produce cluster-dot halftone images can selectively shift the clusters within the cells or with respect to the cell boundaries according to a selected payload when generating the data-bearing halftone image, and image readers that interpret the shifts within the halftone cells can recover the payload.

An example system for producing shifts in cluster dot cells employs circular encoding. In circular encoding, the payload can be recovered from an arbitrarily selected contiguous portion of the code, or cropped portion of the image, without prior knowledge of the carrier image. In order to allow robust data recovery from any portion of the image, a relatively large amount of cells throughout the image are intended to carry data. Additionally, coding techniques also attempt to avoid fiducials or end-of-payload symbols so as to promote image aesthetics.

Existing data generating and recovery techniques for clustered-dot data-bearing halftone images, however, can include limitations as to which clusters can carry data via shifting, particularly when the shifting is confined to other positions inside a single cell. Note, a cluster size of $i^2$ pixels in a cell of i by i pixels is either all black or all white, or other single color of a bi-tonal combination, and in that setting, thus does not carry data via shifting. For a four-by-four cell having sixteen pixels, a cluster size of sixteen pixels is a cell having a single color, which cannot be shifted within the cell boundaries.

Further, not all cluster sizes resulting from a selected dither threshold array have the same freedom to move within a cell. Some larger sizes of cluster configurations translate some pixels of the cluster out of the cell or outside of the cell boundaries if the cluster is shifted by one pixel position. Such limitation makes it difficult to recover data for cluster sizes in the midrange of an image. In a technique in which all pixels of an arbitrarily selected contiguous image are expected to carry data such as circular encoding, the inability to encode data in a relatively large amount of cluster sizes while retaining a shifted cluster pattern within the boundaries of a call can impede robust data recovery in aesthetically pleasing data-bearing images.

Existing data generating and recovery techniques for clustered-dot data-bearing halftone images can also include limitations in the ability to detect shifts without the benefits of fiducials or reference images. While fiducials and reference images allow a decoder system to readily detect cell boundaries and thus shifts with respect to cell boundaries, fiducials detract from the image and reference images place additional overheads on the decoder system. Without fiducials or a reference image, however, decoding techniques attempt to infer cell boundaries, which can be difficult in regions with all clusters shifted in one direction.

FIG. 1 illustrates an example data-bearing medium 100, such as a region of a data-bearing halftone image, having a plurality of cells 102. The cells 102 have at least one cluster size selected from a set of opposite-shifted clusters. For example, a cell i by i pixels can include $i^2$ pixels, and the set of opposite shift clusters can include sizes of one to ($i^2-1$). A cell of four-by-four pixels can include clusters of sizes one to fifteen. The cells 102 can include a pair of opposite shifts of the set of opposite-shifted clusters, which represents a single value. For example, one of the pair of opposite shifts can include a cell having a cluster of a first shift 104 and cell having a cluster of a second shift 106. Shifts can include the cluster repositioned in a portion of cell or with respect to conceptual cell boundaries. For example, clusters 104 are positioned in a first portion of the cell, such as the upper left corner of the cell in the illustration, and clusters 106 are positioned in a second portion of the cell, such as the lower right corner of the cell in the illustration. The position of the cluster with respect to the cell boundaries can be determined by a number of data recovery techniques, such as locating the centroid of the cluster with respect to the conceptual cell boundary. In each case, clusters 104, 106 carry a value, such as a bit, and the bit value is the same—either zero or one. For example, clusters of the first shift 104 and clusters of the second shift 106 each carry a bit value of zero.

In one example, at least one of the cells 102 on the data-bearing medium 100 a cluster of the first shift and the remaining cells representing the value have clusters of the second shift. In another example, half of the cells 102 on the data-bearing medium representing the value can be clusters of the first shift 104 and the other half of the cells 102 representing the value can be clusters of the second shift 106. In a more general example, number of cells 102 featuring a first shift 104 and the numbers of cells 102 featuring the second shift 104 varies cluster to cluster. In yet another example, the data-bearing medium can include a selected area captured in by a data-recovery system. In still another example, the each cell 102 of the value, such as along a line of the data-bearing medium 100, alternates between a cluster of the first shift 104 and a cluster of the second shift 106. Other examples are contemplated.

Figure 2:
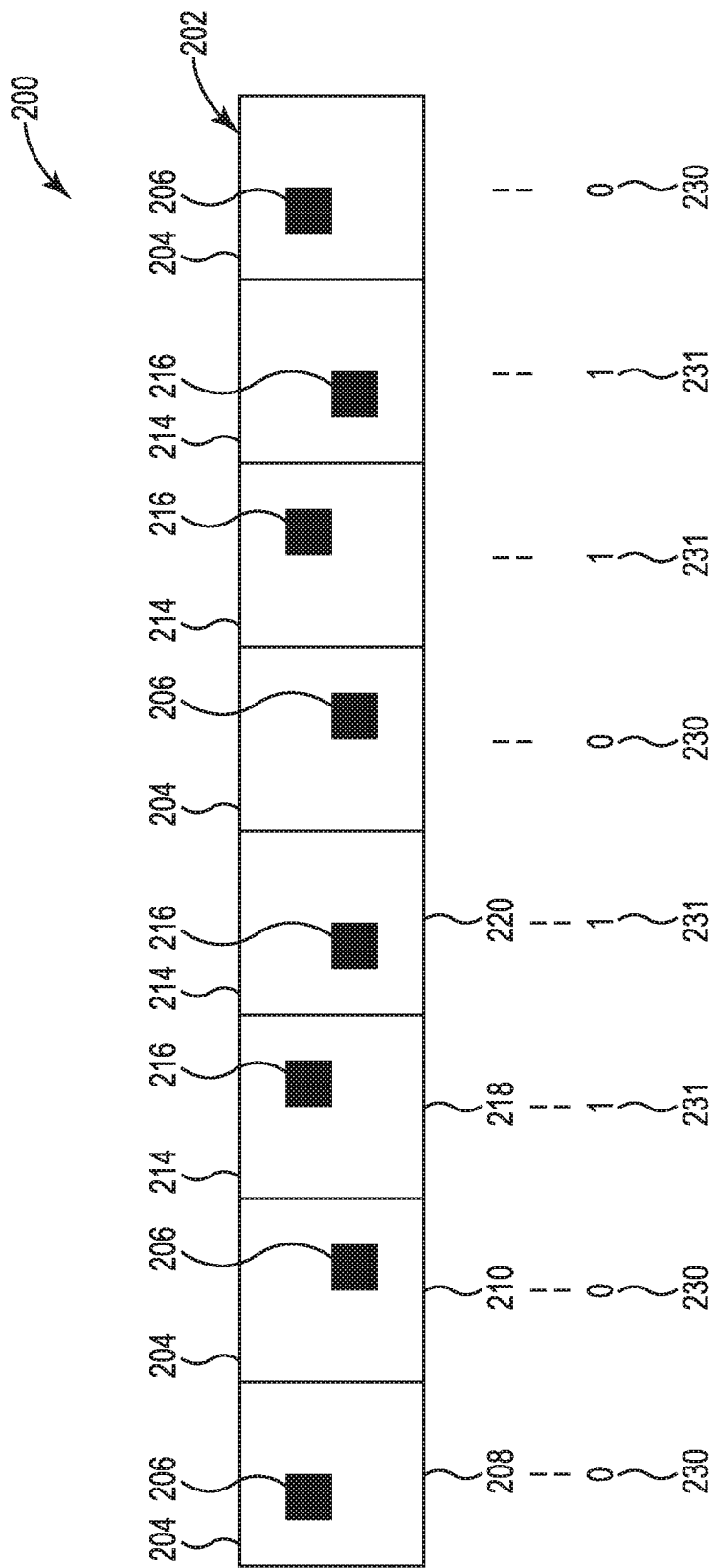
FIG. 2 is a schematic diagram illustrating another example data-bearing medium.

FIG. 2 illustrates an example data-bearing medium 200, such as a region of a data-bearing halftone image, having a plurality of cells 202. The data-bearing medium 200 can include a payload encoded in a (typically much-larger) carrier image. The cells 202 can be included as part of a clustered-dot halftone of the carrier image. The example data-bearing medium 200 includes eight adjacent cells 202 and each of the cells 202 includes a four-by-four matrix of sixteen pixels for illustration with cell boundaries as indicated also for illustration. Each cell 202 may be conceptually separated into different portions, such as quadrants—for instance, each cell 202 of the four by four matrix example can include an upper left or Northwest quadrant, an upper right or Northeast quadrant, a lower right or Southeast quadrant, and a lower left or Southwest quadrant—of four pixels each. In one example, the eight-cell region of the data-bearing halftone image as illustrated may represent a window captured with a data recovery system.

The data-bearing medium 200 includes a first section of a plurality of cells 204 having at least one of a set of first opposite-shifted clusters 206 representing a first value 230. The first value 230 can be a bit value. By way of illustration, the first section of cells 204 includes a highlight cluster of size one, i.e., one black pixel and fifteen white pixels. The centroid of the highlight cluster is included in opposite portions of the cells, i.e., the upper left or Northwest quadrant of the four-by-four matrix and the lower right or Southeast quadrant as opposite-shifted clusters. In the illustration, the each of the cells of the first section 204 represents a bit value of zero. Further, the first section 204 can include at least a pair of cells 208, 210 having opposite shifts of the first opposite-shifted cluster. For example, the value of cell 208 is a zero represented with a Northwest shift and the value of cell 210 is also zero represented with a Southeast shift.

The data-bearing medium 200 also can include a second section of a plurality of cells 214 having at least one of a set of second opposite-shifted clusters 216 representing a second value 231. The second value 231 can also be a bit value. By way of illustration, the second section of cells 214 includes a highlight cluster of size one, i.e., one black pixel and fifteen white pixels. The centroid of highlight cluster is included in opposite portions of the cells, i.e., the upper right or Northeast quadrant of the four-by-four matrix and the lower left or Southwest quadrant as opposite-shifted clusters. In the illustration, each of the cells of the second section 214 represents a bit value of one. Further, the second section 214 includes at least a pair of cells 218, 220 having opposite shifts of the second opposite-shifted cluster. For example, the value of cell 218 is one represented with a Northeast shift of the cluster and the value of cell 220 is also one represented with a Southwest shift of the cluster. In the example, the plurality of cells 202 can provide an eight-bit payload along the adjacent cells of 0b00110110, or 0x36.

Figure 3:
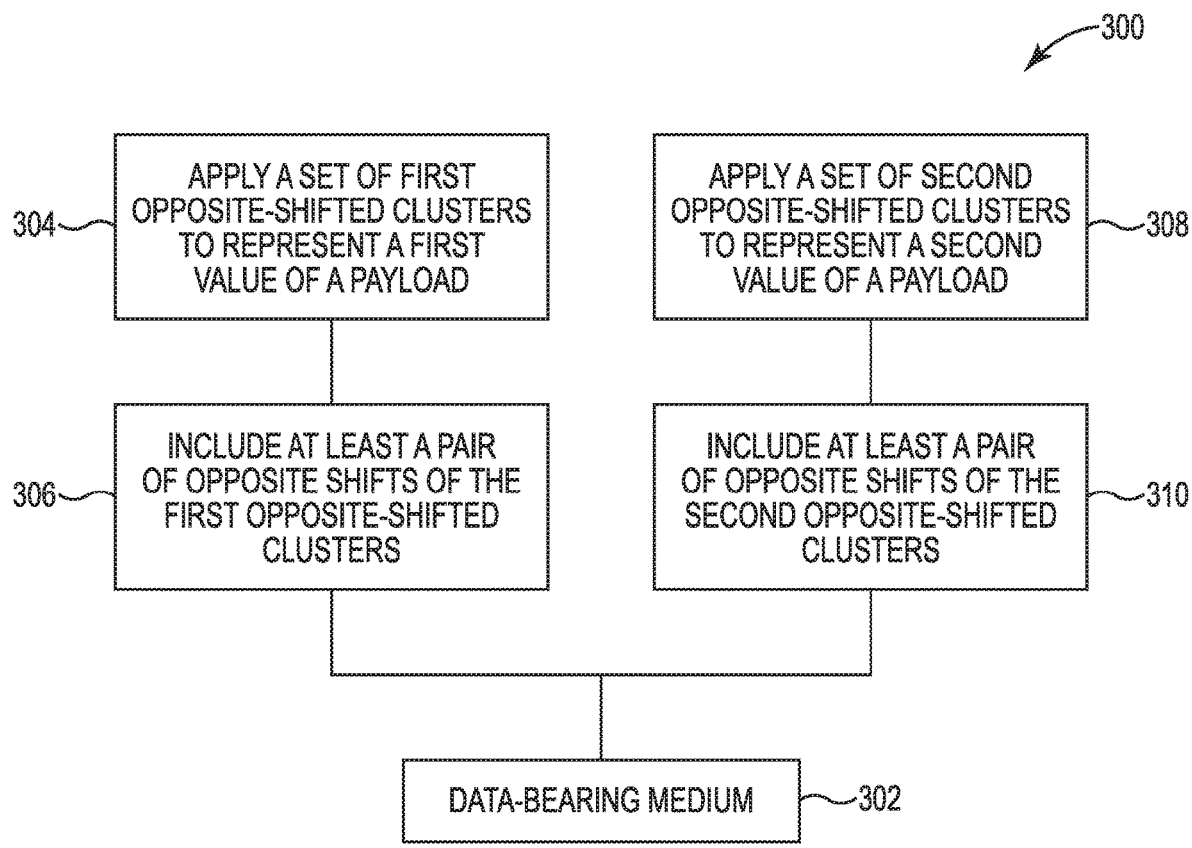
FIG. 3 is a block diagram illustrating an example method of encoding a payload onto a data-bearing medium.

FIG. 3 illustrates a method 300 that can be employed to encode a payload onto a data-bearing medium 302. At least one of a set of first opposite-shifted clusters representing a first value of the payload is applied to a first section of the data-bearing medium at 304. A combination of opposite shifts of the first opposite-shifted cluster is included in the first section of the plurality of cells at 306. A combination of second opposite-shifted clusters representing a second value of the payload is applied to a second section of the data-bearing medium at 308. At least a pair of opposite shifts of the second opposite-shifted cluster is included in the second section of the plurality of cells at 310. The number of clusters of either the first or second opposite-shifted clusters can be an even or an odd number. The number of clusters can be zero or more.

The example method 300 can be implemented to include a combination of one or more hardware devices and computer programs for controlling a system, such as a computing system having a processor and memory, to perform method 300 to encode a payload onto a data-bearing medium. In one example, the system can include a printing device to print the first and second opposite shifted clusters as part of a data-bearing halftone image.

Method 300 can be implemented as a computer readable medium or computer readable device having set of executable instructions for controlling the processor to perform the method 300. Computer storage medium, or non-transitory computer readable medium, includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by a computing system. Accordingly, a propagating signal by itself does not qualify as storage media.

Figure 4:
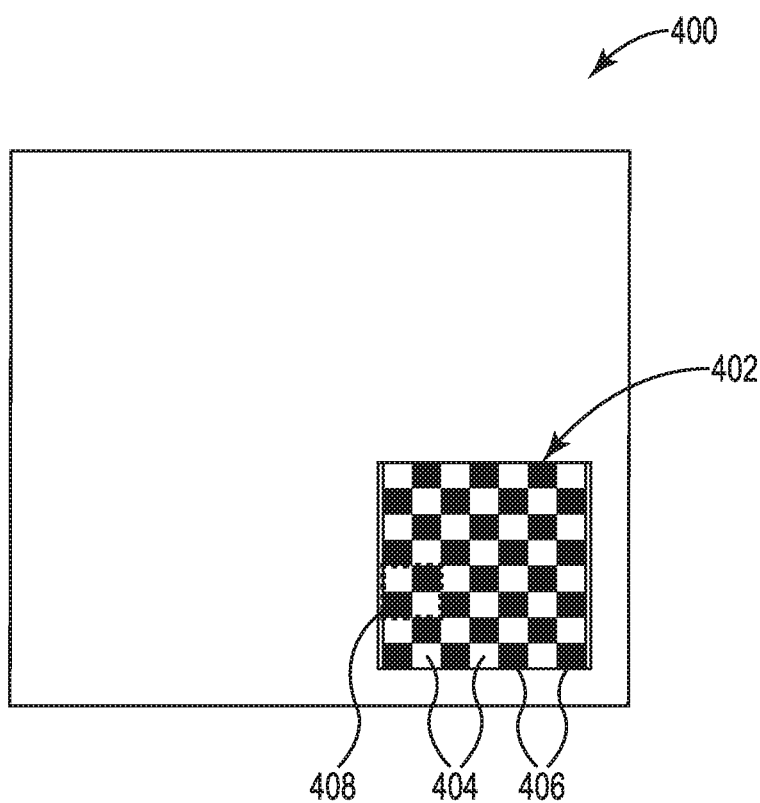
FIG. 4 is a schematic diagram illustrating an example data-bearing medium such as the example data-bearing media of FIGS. 1 and 2.

FIG. 4 illustrates an example data-bearing medium 400, such as a data-bearing halftone image having data-bearing clustered-dot halftones generated with a method such as method 300. Data-bearing medium 400 can include an example of data-bearing media 100, 200. The data-bearing medium 400 can comprise a halftone pattern including a region 402 having placeholders illustrating unshaded highlight cells 404 and shaded shadow cells 406 arranged in a checker-board pattern on the data-bearing medium 400. In one example, region 402 can represent a window captured with a data recovery system, and the data-bearing halftone pattern may extend outside of region 402. The cells 404, 406 in region 402 can correspond with data-bearing elements that may encode a digital payload. For instance, each data-bearing cell 404, 406, or carrier cell, can encode a bit of the payload. In one example of a halftone pattern, one of the highlight cells 404 or the shadow cells 406 are data-bearing cells and the other are not data-bearing cells. In one implementation, the payload may be repeated throughout the data-bearing medium 400. For example, the payload may be repeated on each line and encoded by circular shifting. Other examples of encoding the payload are contemplated.

A common example of a clustered-dot halftone can include an array 408 of two highlight cells 404 and two shadow cells 406 forming a checker-board square pattern. Each highlight cell 404 and shadow cell 406 in the array 408 can include a matrix of four pixels by four pixels. Thus, the example array 408 is a matrix of eight-by-eight pixels. For the purposes of illustration, the pixels may be set as either black or white as the bi-tonal combination. Data may be carried on black clusters in the highlight cells 404, or highlight clusters, and on white clusters in the shadow cells 406, or shadow clusters. In dark areas of the carrier image, all sixteen pixels of each highlight cell 404 may become black and thus unable to carry data. In light areas of the carrier image, all sixteen pixels of each shadow cell 406 may become white and thus unable to carry data.

Figure 5:
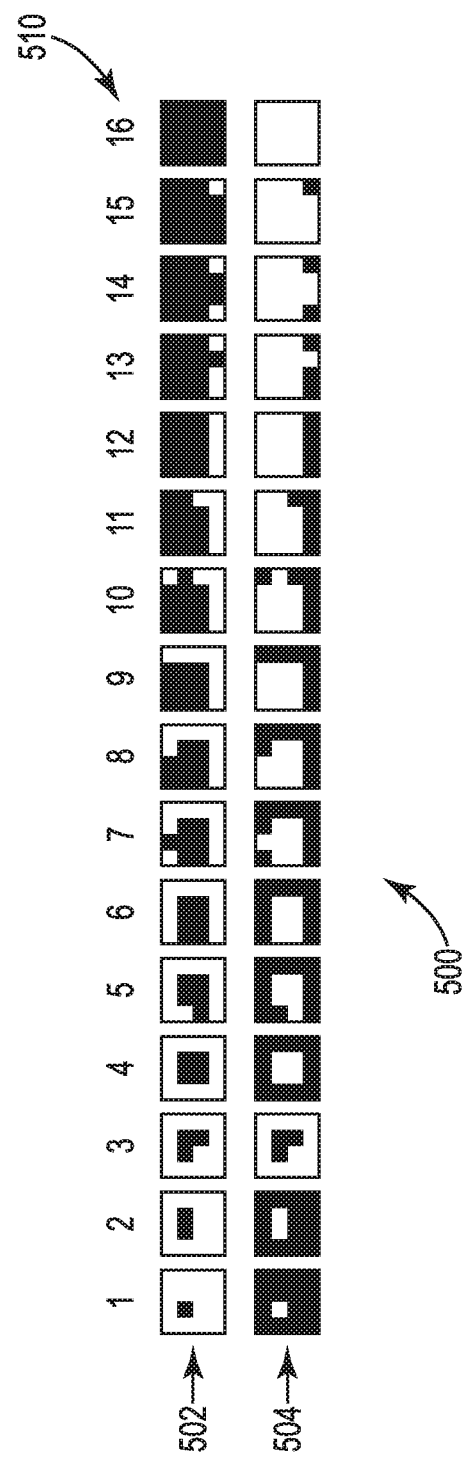
FIG. 5 is a diagram illustrating an example set of highlight and shadow clusters of sizes one to sixteen.

FIG. 5 illustrates a common example of clusters 500 of sizes 510 one to sixteen for highlight clusters 502 and shadow clusters 504 in cells 512 having four-by-four matrix of pixels according to a common dither threshold array. The four-by-four highlight clusters 502 can adopt the shapes in which the size of the cluster includes the number of black pixels that comprise the cluster of the cell. The four-by-four shadow cluster 504 can adopt the shapes in which the size of the cluster includes the number of white pixels that comprise the cluster of the cell. The shadow clusters 504 in this example are inverses of the pixel color of the corresponding size of the highlight cluster 502. The dither template used in cluster-dot halftoning can dictate the cluster shapes for each size. The clusters are nucleated with centroids kept close to the center of the cell. Cluster sizes one through nine can execute a shift one pixel toward the bottom of the cell in the illustration and one pixel toward the right side or boundary of the cell in the illustration, or a Southeast shift, without translating out of the cell. Clusters sizes ten through fifteen execute a Southeast shift by translating pixels out of the cell. Further, the centroids of each cluster are within a single pixel of each other and span three quadrants of the cell.

Figure 6:
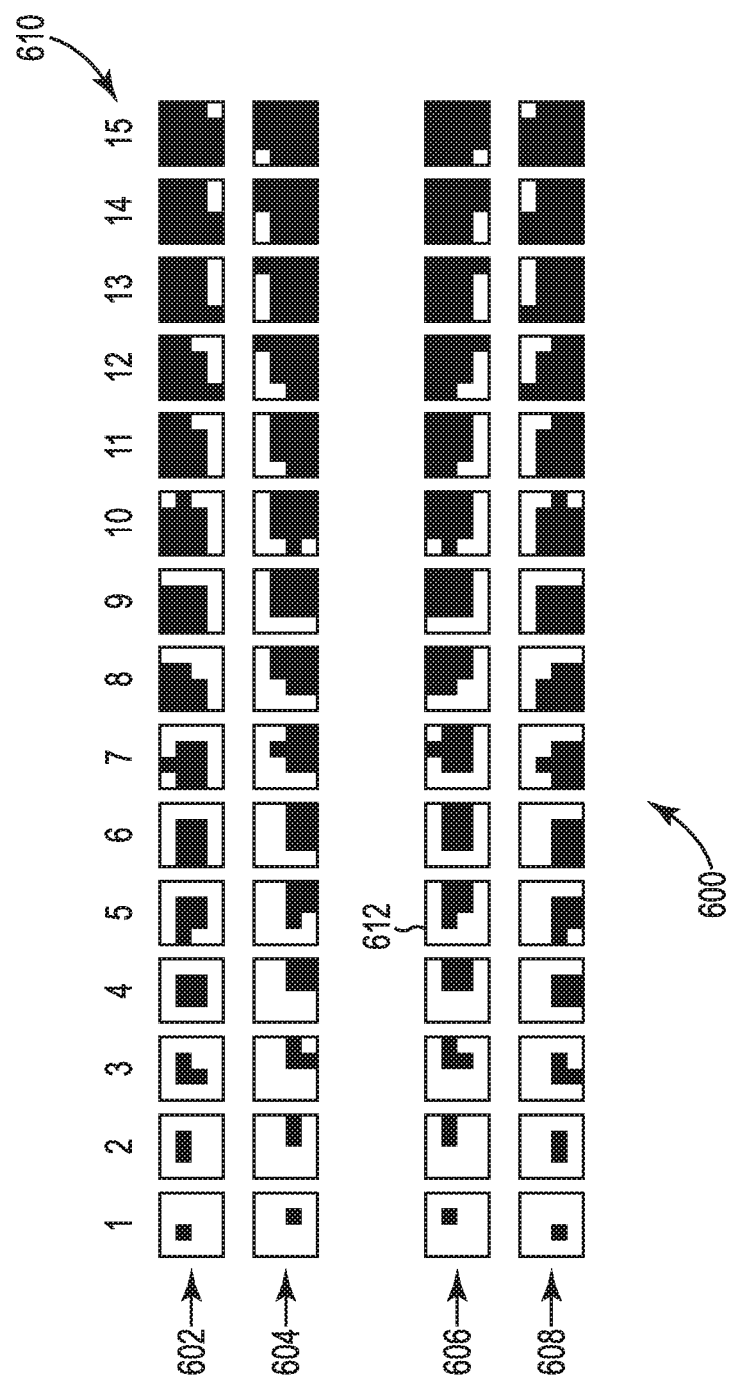
FIG. 6 is a diagram illustrating an example of collections of highlight clusters of sizes one to fifteen, which can be used with the example data-bearing media of FIGS. 1 and 2.

FIG. 6 illustrates another example of shifted clusters 600 for sizes one to fifteen 610 with respect to cell boundaries 612 for use with the data-bearing medium 400. Four collections 602, 604, 606, 608 of cluster sizes one through fifteen 610 are illustrated in various shifts with respect to cell boundaries of the same shape for each size. The collections 602, 604, 606, 608 are highlight clusters and can include corresponding shadows clusters (not shown), which are the inverses of the pixel color of the highlight cluster. For example, collection 602 includes clusters having centroids in the Northwest quadrant of the cell, or the upper left quadrant in the illustration. Collection 604 includes clusters having centroids in the Southeast quadrant of the cell, or the lower right quadrant in the illustration. Collection 606 includes clusters having centroids in the Northeast quadrant of the cell, or the upper right quadrant in the illustration. Collection 608 includes clusters having centroids in the Southwest quadrant of the cell, or the lower left quadrant in the illustration. The collection of 602, 604, 606, 608 of highlight clusters can also include corresponding shadow clusters (not shown) that are determined by a different arrangement of collections. A data recovery system can detect the location of the centroid of each cluster with respect to the cell to determine the shift and the value represented with the cell. For example, a data recovery system can detect the cell quadrant of the centroid to determine if the cell encodes a first value or a second value.

Clusters 600 include shapes for sizes one to fifteen that provide for shifting of the centroid in each of four quadrants of the cell without translating the cluster out of the cell. The example shapes of the clusters 600 allow for data to be stored in clusters having sizes one through fifteen.

In one example, collections 602, 604 can be a first set of opposite-shifted clusters representing a first value, such as a binary zero. A cluster selected from collections 602, 604, as well as the corresponding shadow clusters, can represent the first value. In this example, collections 606, 608 can be a second set of opposite-shifted clusters representing a second value, such as a binary one. A cluster selected from collections 606, 608, as well as the corresponding shadow clusters, can represent the second value.

In this example, a first section of a plurality of cells having at least a set of first opposite shifted clusters can include clusters from collections 602, 604. At least one cluster from collection 602 and at least one cluster from collection 604 are included in the first section. Further, a second section of a plurality of cells having at least a set of second opposite shifted clusters can include clusters from collections 606, 608. At least one cluster from collection 606 and at least one cluster from collection 608 are included in the second section. In another example, a first section of a plurality of cells of first opposite shifted clusters can include a combination of clusters from collection 602 and collection 604, while a section of a plurality of cells of a second opposite shifted clusters can include a combination of clusters from collection 606 and collection 608.

Other combinations of collections can be included as opposite-shifted clusters. For example, a data recovery system may detect the position of the centroid or other feature of the cluster with respect to a cell boundary or other feature of the cell, and opposite-shifted clusters include collections of clusters that have differentiating features for each size. In the present example, the position of the centroid of each cluster with respect to a cell can be determined with a data recovery system, and thus opposite-shifted clusters include collections that have differentiating centroids with respect to the cell boundaries. The present example includes shapes that place the clusters in various quadrants of the cells, but centroids or other features of the clusters can be placed in other regions or areas, or other combinations of quadrants, regions, or areas of the cell can be used as opposite-shifted clusters.

By shifting the centroids for clusters having the same value, data recovery systems can detect shifts without the benefits of fiducials or references images and in windows in which the values are all the same. Recovery systems can infer cell boundaries from opposite-shifted pairs of clusters representing the same value.

In one instance, at least one cluster of collection 602 and at least one cluster of collection 604 are included in a window captured by a recovery system to represent a first value if that first value is present in the window. In another instance, a combination of clusters of collection 602 and clusters of collection 604 are included in a window captured by a recovery system to represent a first value if that first value is present in the window. In a more particular instance, about half of the clusters representing the first value are from collection 602 and about half of the clusters representing the first value are from collection 604 in a window captured by a recovery system. In still a more particular instance, the clusters representing the first value are alternated between a cluster from collection 602 and from collection 604 along a line of the data-bearing medium. Similarly, at least one cluster of collection 606 and at least one cluster of collection 608 are included in a window captured by a recovery system to represent a second value if that second value is present in the window. In another instance, a combination of clusters of collection 602 and clusters of collection 608 are included in a window captured by a recovery system to represent a first value if that value is present in the window. In a more particular instance, about half of the clusters representing the second value are from collection 606 and about half of the clusters representing the second value are from collection 608 in a window captured by a recovery system. In still a more particular instance, the clusters representing the second value are alternated between a cluster from collection 606 and from collection 608 along a line of the data-bearing medium. By alternating between clusters for each pair of opposite shifts for a given value, the average centroid will stay close to the center of the cell regardless of payload.

Designs of the collections 602-608 can range from favoring image aesthetics to favoring image recovery performance. Image aesthetics are enhanced for collections in which a cluster size does not change shape for a size and when the shift is limited to one pixel. Data recovery performance is improved as the centroids are further separated in the shifts. Clusters 600 provide an example of generally conservative centroid separation between shifts and the centroid shifts are limited to about one pixel. Further cluster sizes one through nine do not change shape. Clusters 600 can present an example for improved aesthetics in high performance data encoding and recovery systems.

Figure 7:
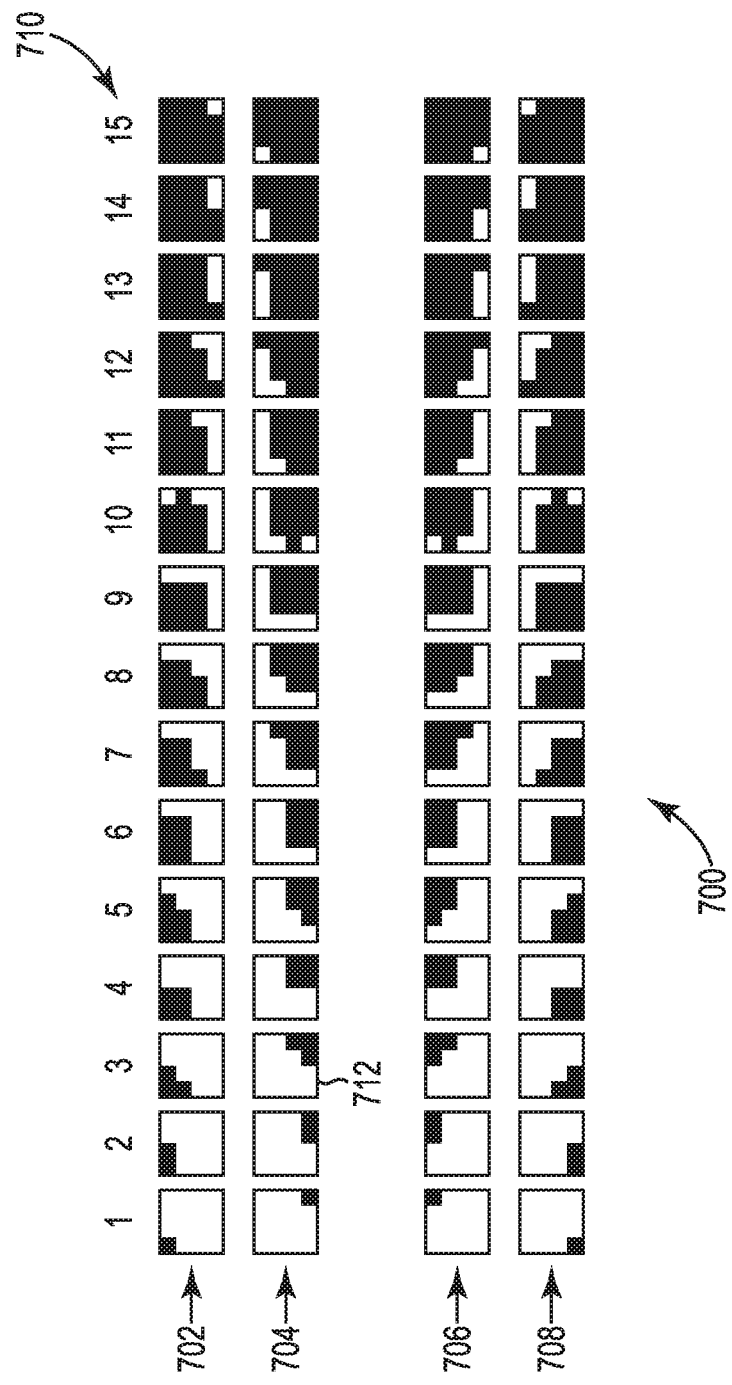
FIG. 7 is a diagram illustrating an example of other collections of highlight clusters of sizes one to fifteen, which can be used with the example data-bearing media of FIGS. 1 and 2.

FIG. 7 illustrates an example of shifted clusters 700 for use with the data-bearing medium 400, in which the clusters 700 have a more aggressive shift or greater centroid separation between collections to improve data recovery. Four collections 702, 704, 706, 708 of cluster sizes one through fifteen 710 are illustrated in various shifts with respect to cell boundaries 712 of the same shape for each size. The collections 702, 704, 706, 708 are highlight clusters and can include corresponding shadows clusters (not shown), which are inverses of the pixel color of the highlight cluster. Collection 702 includes clusters having centroids in the Northwest quadrant of the cell, or the upper left quadrant in the illustration. Collection 704 includes clusters having centroids in the Southeast quadrant of the cell, or the lower right quadrant in the illustration. Collection 706 includes clusters having centroids in the Northeast quadrant of the cell, or the upper right quadrant in the illustration. Collection 708 includes clusters having centroids in the Southwest quadrant of the cell, or the lower left quadrant in the illustration. The shapes and positions of the clusters for sizes one through eight in clusters 700 differ from clusters 600, and the shift of the centroids with respect to the cell boundaries is more pronounced in those sizes to improve in data recovery, which may come at the expense of image aesthetics.

A data recovery system can detect the location of the centroid of each cluster with respect to the cell to determine the shift and the value represented with the cell. For example, a data recovery system can detect the cell quadrant of the centroid to determine if the cell encodes a first value or a second value. A combination of two of collections 702-708 may be applied as a set of opposite-shifted clusters that that represent a first value and a combination of the other two of collections 702-708 may be applied as a set of opposite-shifted clusters that represent a second value. For example, collections 702, 704 may be a first set of opposite-shifted clusters representing a first value, such as binary zero, and collections 706, 708 may be a second set of opposite-shifted clusters representing a second value, such as binary one.

Clusters 600 and 700 illustrate two examples of intra-cell shifting, or shapes in which the pixels that make up the clusters are not translated out of the cell from shifting. In some instances, clusters that include pixels translated out of the cell can carry data as well. In a highlight region of an example halftone image, half the cells of the checkerboard arrangement are completely white while in a shadow region of the halftone image, half the cells of the checkerboard arrangement are completely black. In this example, the cells above, below, to the right, and to the left (or in the directions North, South, East, and West) of a halftone cell, or data-bearing cell, will be empty. In such instances, pixels of the clusters may be translated out of the cell in the shifts and still carry data as an inter-cell shift.

Figure 8:
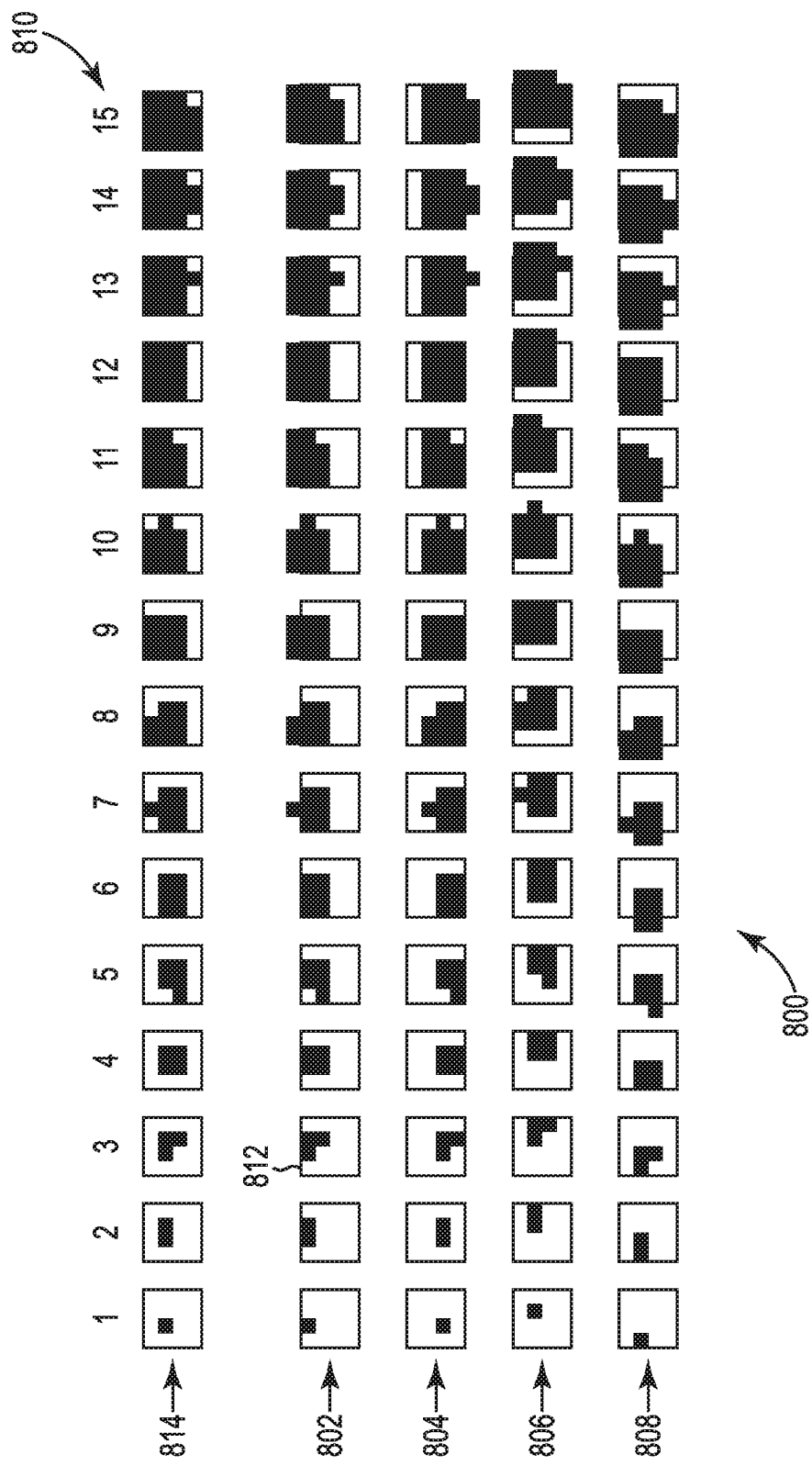
FIG. 8 is a diagram illustrating an example of collections of the highlight clusters of sizes one to fifteen of FIG. 5, which example collections can be used with the example data-bearing media of FIGS. 1 and 2.

FIG. 8 illustrates shifted clusters 800 sizes one to fifteen 810 with respect to cell boundaries 812 for use with the data-bearing medium 400, in which the clusters 800 have shapes including sizes with pixels translated out of the cell. Clusters 800 include shapes based on the cluster shapes of sizes one to fifteen of highlight clusters 814 selected from highlight clusters 502 of FIG. 5. Four collections 802, 804, 806, 808 of cluster sizes one through fifteen 810 are illustrated in various shifts with respect to cell boundaries of the same shape for each size. The collections 802, 804, 806, 808 are highlight clusters and can include corresponding shadows clusters (not shown), which are inverses of the pixel color of the highlight cluster. Such corresponding shadows clusters (not shown) may also include variations on the inverses of the pixel color of the highlight cluster. Collection 802 includes clusters having centroids in the North section of the cell, or the upper section in the illustration. Collection 804 includes clusters having centroids in the South section of the cell, or the lower section in the illustration. Collection 806 includes clusters having centroids in the East section of the cell, or the right section in the illustration. Collection 808 includes clusters having centroids in the West section of the cell, or the left section in the illustration.

One example of a data recovery system detects the location of the centroid of each cluster with respect to the cell to determine the shift and the value represented with the cell. For example, a data recovery system can detect the cell section of the centroid to determine if the cell encodes a first value or a second value. A combination of two of collections 802-808 may be applied as a first set of opposite-shifted clusters that that represent a first value and a combination of the other two of collections 802-808 may be applied as a second set of opposite-shifted clusters that represent a second value. For example, collections 802, 804 may be a first set of opposite-shifted clusters representing a first value, such as binary zero, and collections 806, 808 may be a second set of opposite-shifted clusters representing a second value, such as binary one. Inter-cell shifting can be more aggressive than intra-cell shifting as the opposite-shifted centroids can be separated by a greater distance making for more robust data recovery performance.

In other examples, the shadow clusters of a given one or more sizes of one to fifteen are not merely inverses of the corresponding highlight clusters. In some examples, the shadow clusters of a given one or more sizes can assume different shapes than the highlight clusters. Further, in some examples, the shadow clusters representing a given value can assume different opposite shifts than the corresponding highlight clusters. For example, collections of highlight clusters can be intra-cell shifted in the ordinal directions of Northeast, Northwest, Southeast, and Southwest whereas the shadow clusters can be inter-cell shifted in the cardinal direction of North, South, East, and West. In such an example, the data recovery system can look for ordinal shifts in highlight clusters and cardinal shifts in shadow clusters to determine if a cell or region is a highlight or shadow. In this example, alignment can be improved by distinguishing between highlight clusters and shadow clusters.

Figure 9:
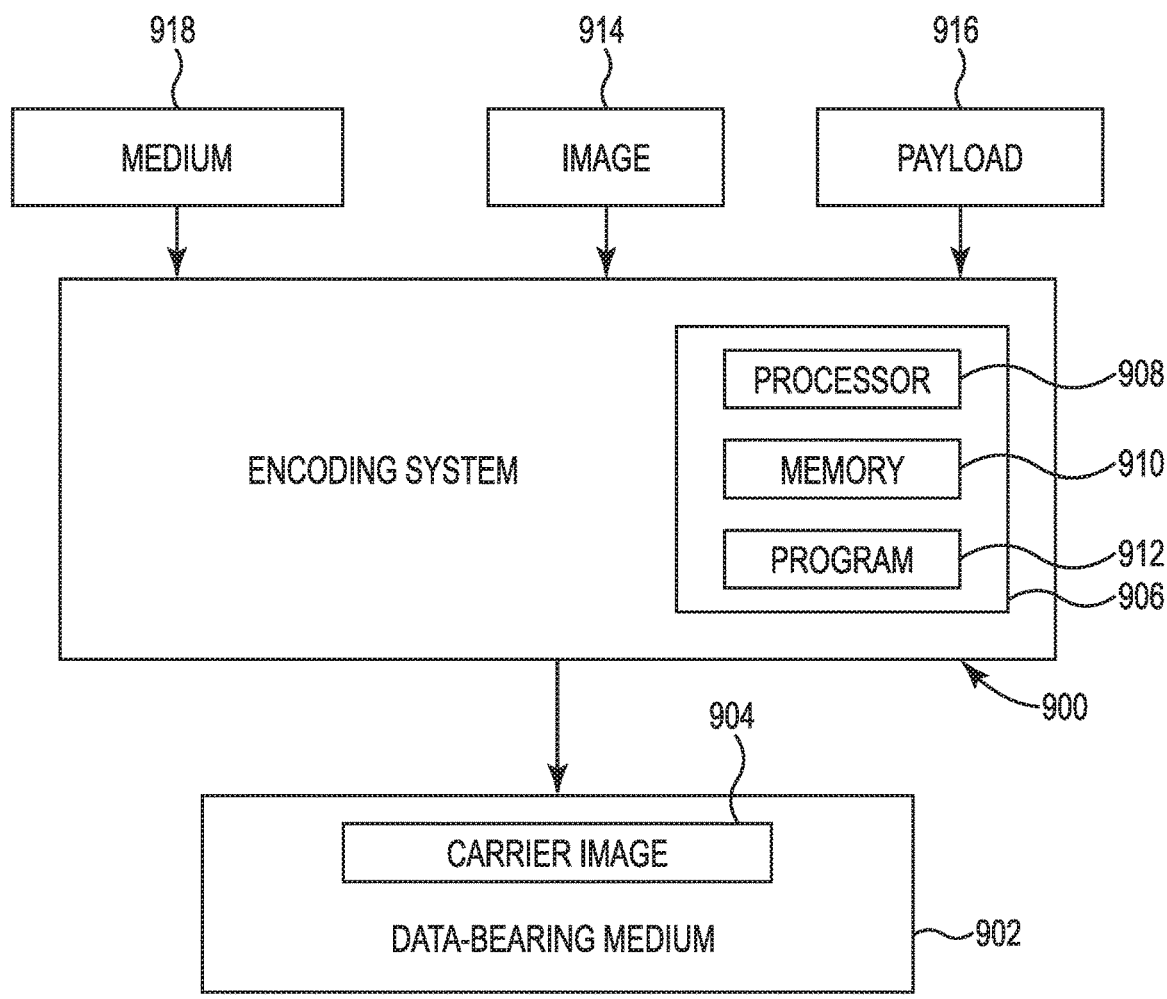
FIG. 9 is a schematic diagram of an example encoding system for generating example data-bearing media of FIGS. 1 and 2 such as via example method of FIG. 3.

FIG. 9 illustrates an example encoding system 900 that can be used to create a data-bearing medium 902. In the example, the data-bearing medium 902 includes a data-bearing halftone image 904. Example system 900 includes a computing system 906 having a processor 908 and memory 910 that are configured to implement an example method of this disclosure, such as method 300, as a set of computer readable instructions stored in memory 910 for controlling the processor 908 to perform the method. In one example, the set of computer readable instructions can be implemented as a computer program 912 that can include various combinations of hardware and programming configured to operate on computing system 906. Computer program 912 can be stored in memory 910 and executed by the processor 908 to create the data-bearing halftone image 904 included on the data-bearing medium 902. In the example, the encoding system 900 receives a carrier image 914 and a payload 916 to encode into the image 914 via a data-bearing halftone image. In the example, the encoding system 900 also receives the medium 918 onto which the carrier image 914 is encoded.

In one example, the encoding system 900 includes a printing device—such as a printer, copier, fax machine, multifunction device including additional scanning, copying, and finishing functions, all-in-one device, or other devices such as pad printers to print images on three dimensional objects and three-dimensional printers (additive manufacturing)—to receive digital images or digital models from the computing system 906 and medium 918, such as plain paper, photo paper, labels, and other media, to produce the data-bearing medium 902. Other examples of data-bearing media are contemplated.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A data-bearing medium, comprising:
a section of a plurality of cells having a set of opposite-shifted clusters,
wherein the plurality of cells includes a combination of opposite shifts, including a first cell having a cluster of a first shift and a second cell having a cluster of a second shift, of the set of opposite-shifted clusters representing a single value.

2. The data-bearing medium of claim 1 wherein the set of opposite-shifted clusters includes one of intra-cell shifted clusters and inter-cell shifted clusters.

3. The data-bearing medium of claim 1 wherein the set of opposite-shifted clusters includes one of highlight clusters and shadow clusters.

4. The data-bearing medium of claim 1 wherein the single value is a binary digit including one of a zero and a one.

5. The data-bearing medium of claim 1 wherein the cluster size includes one of a clusters size from one to fifteen.

6. The data-bearing medium of claim 1 wherein for the single value, highlight clusters include a first set of opposite-shifted clusters having a first shift and shadow clusters include a second set of opposite-shifted clusters having a second shift.

7. The data-bearing medium of claim 1 wherein the pair of the opposite shifts of the first section includes shifts in the ordinal directions.

8. The data-bearing medium of claim 1 wherein the plurality of cells comprise a clustered-dot halftone of a carrier image.

9. A data-bearing medium, comprising:
a first section of a plurality of cells having at least one of a set of first opposite-shifted clusters representing a first value, the first section of the plurality of cells including at least a pair of opposite shifts of the set of first opposite-shifted clusters; and
a second section of the plurality of cells having at least one of a set of second opposite-shifted clusters representing a second value, the second section including at least a pair of opposite shifts of the set of second opposite-shifted clusters.

10. The data-bearing medium of claim 9 wherein the first section and the second section include a payload.

11. The data-bearing medium of claim 9 wherein the pair of the opposite shifts of the first section includes shifts in one of the ordinal directions and in the cardinal directions.

12. The data-bearing medium of claim 9 wherein the first section and second section include alternating shifts of opposite-shifted clusters representing the first value.

13. A non-transitory computer readable medium to store computer executable instructions to control a processor to:
apply to the data-bearing medium at a first section of a plurality of cells of a set of first opposite-shifted clusters representing a first value of the payload, the first section of the plurality of cells including shifts of the first opposite-shifted cluster; and
apply to the data-bearing medium at a second section of the plurality of cells of a set of second opposite-shifted clusters representing a second value of the payload, the second section of the plurality of cells including shifts of the second opposite-shifted cluster.

14. The computer readable medium of claim 13 wherein the pair of opposite shifts in the first section include a first centroid shift and a second centroid shift wherein a half of the cells of the first section include the first centroid shift and another half of the cells of the first cells of the first section include the second centroid shift.

15. The computer readable medium of claim 14 wherein the first section includes alternating the first centroid shift and the second centroid shift.

* * * * *